RE 24381

United States Patent Office 2,776,187
Patented Jan. 1, 1957

2,776,187

PRODUCTION OF TRIPOLYPHOSPHATES

Otto Pfrengle, Budenheim, near Mainz, Germany, assignor to Chemische Fabrik Budenheim Aktiengesellschaft, Mainz, Germany, a joint-stock company of Germany No Drawing. Application September 4, 1951, Serial No. 245,087

Claims priority, application Germany September 8, 1950

6 Claims. (Cl. 23—106)

This invention relates to the production of tripolyphosphates.

It is an object of this invention to speed up, in the production of tripolyphosphates by heat treating a phosphate for calcination, the conversion reaction by catalytic action.

Hitherto polyphosphates have been produced by smelting down orthophosphates or mixtures of orthophosphates with anhydrous phosphates or mixtures of different anhydrous phosphates and holding the molten mass for some time at a temperature below its melting point.

Polyphosphates have also been produced by heating phosphate mixtures to a temperature below the melting point, starting as a rule from solutions of the orthophosphates which are first calcined and then converted into polyphosphate in the same or a further process stage. According to U. S. patent specifications No. 2,419,147 and No. 2,419,148 calcination of the orthophosphate mixture and its conversion into tripolyphosphate is effected in a single operation by spraying the solution of the orthophosphate inside a rotating tube across a flame onto heated tripolyphosphate obtained in a previous operation and continuing the heating in the rotating tube for a certain period of time.

The methods hereabove described involve several drawbacks. In none of these prior methods the components of the reaction mass can be completely converted into tripolyphosphate. With a higher alkaline pH adjustment considerable quantities of tetrasodium pyrophosphate are formed. With an acid pH adjustment trimetaphosphate and Maddrell's salt are formed. With a neutral pH adjustment all these components are present as a rule in the product of reaction.

Maddrell's salt is undesirable in the product in view of its insolubility. Pyrophosphate and trimetaphosphate lower the complex binding capacity relative to calcium and thereby impair the utility of the product.

Apart therefrom, it is not possible to convert phosphates by the processes hitherto available to a practically useful extent into polyphosphates at temperatures of or below 300° C. Tests made with an orthophosphate mixture of the kind usually adopted as starting material, when heating it to 260° C. for 6½ hours only yielded 20% of $Na_5P_3O_{10}$, which were accompanied by 64% pyrophosphate, 14% trimetaphosphate and 2% Maddrell's salt. A mixture of this constitution cannot be termed a tripolyphosphate. If heating is continued for a longer period of time, the percentage of tripolyphosphate remained stationary, but the content of insoluble Maddrell's salt rose. Since at temperatures above 300° C. the formation of Maddrell's salt, which is particularly undesirable, is greatly favored, any process operable at a temperature below 300° C. offers a great interest.

I have now found that the conversion of the starting mixture of phosphates into tripolyphosphate can be improved considerably by catalytic action, if to the mixture are added, either before or after its calcination, nitrogen compounds which when heated with the phosphate mixture, develop gaseous decomposition products.

A speeding up of the reaction can already be obtained by the addition of nitrates, for instance alkali metal nitrates and better still nitrates of alkaline earth metals, of aluminum or of ammonium.

The presence of nitric acid or of the nitrates in the production of tripolyphosphates has never been described. If oxidation agents including also nitric acid were present in the production of pyrophosphates, such agents were merely added for the purpose of decomposing organic compounds and thereby improving the color of the product.

It has however not been known that the speed of formation of tripolyphosphates can be raised by such additions. If this speeding up of the reaction is intended by adding nitrates, but not other nitrogen compounds, the percentage of such nitrates must be considerably higher and must exceed 0.5%.

An addition of amidophosphoric acid is still more favorable, but the highest speed of reaction is obtained by the use of compounds in which the nitrogen is bound to carbon, such as urea, guanidine, dicyandiamide, semicarbazide and hexamethylenetetramine. I have found that it is advisable to use these compounds in the form of their nitrates or in solution in nitric acid.

The presence of such additions renders it possible to effect a complete conversion of the starting phosphate mixture into tripolyphosphate at a temperature of 250° C.

In this manner of proceeding, tripolyphosphates of a high degree of purity which form entirely clear and limpid solutions, are obtained with a high degree of heat economy.

The effect exerted in this reaction by the catalysts is not limited to temperatures of or below 300° C. I have made sure of this by the following tests.

The mixture containing orthophosphate calcined by spraying together with urea dissolved in nitric acid was heated in a shallow bowl in a muffle furnace. Another bowl was heated in this furnace in the same operation which contained the same orthophosphate mixture, however no catalyst. After 30 minutes' heating to 400° C. the mixture containing the catalyst was found to contain 97% $Na_5P_3O_{10}$, while the mixture free from the catalyst contained only 87%. After one hour's heating to 400° C. the percentages of tripolyphosphate had not risen any further which means that the maximum had been reached after half an hour. On the other hand, the mixture containing the catalyst had been converted practically completely into tripolyphosphate, whereas the mixture free from the catalyst contained also a mixture of pyro and trimetaphosphate.

When heated 30 minutes to 400° C., the mixture to which the catalytic material had been added, contained 95.5% tripolyphosphate, while the mixture free from catalytic material only contained 87%, which after another half an hour's heating rose to 91%. After one hour's heating of the material containing the catalyst, 95% were $Na_5P_3O_{10}$. In other words, a 30 minutes' treatment at 460° C. was excessively long.

When heated to 540° C., the material containing the catalyst after 30 minutes showed a content of 96% $Na_5P_3O_{10}$, while the material free from the catalyst contained only 93.5%. This shows that even at a temperature of 540° C. the catalyst exerted a noticeable effect of speeding up the reaction and raising the yield.

Apart from the shortening of the reaction period and the saving of heat energy, the presence of the catalyst also offered another important advantage. It was found that in this manner the low-temperature modification of the tripolyphosphate would be obtained in a rotary furnace. As is well known, the low-temperature modification as compared with the high-temperature modification, offers the advantage of possessing a higher solubility. In an orthophosphate mixture containing no catalytic material in order to avoid unduly long periods of reaction it becomes necessary to raise the temperature, with the effect that a formation of the high-temperature modification can scarcely be avoided.

The catalysts mentioned above remain effective also if the proportion of alkali metal, for instance $Na_2O$ to the phosphoric acid is higher or lower than the proportion of 5:3 which must be present when producing sodium tripolyphosphate. If more alkali is present, i. e. if for instance more than 2 mols disodium phosphate are present per mol of monosdium phosphate, heating to higher temperatures will yield mixtures of pyrophosphate and tripolyphosphate. At lower temperatures, for instance at 300° C., it is not possible to obtain besides pyrophosphate also tripolyphosphate. If however one of the catalysts mentioned above is added then, besides pyrophosphate also tripolyphosphate is formed with the theortical yield. An addition of sodium nitrate or nitric acid has been found particularly useful in such a case.

The presence of the catalysts renders it also possible to proceed in a different manner. If the conditions of conversion are suitably chosen, the conversion into polyphosphate occurs almost instantly. The drying, calcining and converting into polyphosphate can be carried through in this manner in a single operation, for instance by spraying a solution of orthophosphate at a suitable temperature into a column with the result that the formation of the polyphosphate occurs within a few seconds.

This new way of proceeding is differentiated from the processes described in the U. S. patent specifications mentioned hereabove by the fact that in the old processes the spraying of the starting mixture leads first to the formation of calcined orthophosphate which is converted into tripolyphosphate only after one hour's heating in the rotary furnace.

The treatment of the phosphate material with products of decomposition of nitrogen compounds can also be carried out in such manner that during the heating of the starting mixture, for instance in a rotary tube, the gases, such as for instance $NO_2$ or $N_2O$ which result in the decomposition of the nitrogen compounds, are conducted into contact with the starting mixture whereby a considerable speeding up of the formation of the tripolyphosphate is obtained also.

In practicing my invention I may for instance proceed as follows:

*Example 1*

10.97 kgs. $NaH_2PO_4.H_2O$ are molten together with 50 kgs. $Na_2HPO_4.12H_2O$ and to the molten mass is added a solution of 306 grams urea in 1020 grams concentrated nitric acid. This mixture is sprayed for calcination onto a roller and the dry mixture is then conveyed through a rotating tube heated from within, the maximum temperature ascertained in the material escaping from the tube being 260° C. The reaction mass passed through the furnace within 10 minutes. The product thus obtained forms limpid solutions in water and contains $P_2O_5$ almost exclusively in the form of sodium tripolyphosphate.

*Example 2*

12 kg. anhydrous monosodiumphosphate

and 28.4 kg. anhydrous disodiumphosphate

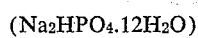

are molten together with 1 kg. guanidine nitrate and 0.5 kg. conc. nitric acid, and dried on a calcination roller.

The dry powder is then treated one and a half hour in a muffle furnace at a temperature of about 260° C. In this way substantially the whole orthophosphate is converted in tripolyphosphate whereas without the addition of the guanidine nitrate and nitric acid only about 20% tripolyphosphate would have been formed.

*Example 3*

1000 kg. technical phosphoric acid containing 20% $P_2O_5$, which has been obtained by the conversion of phosphate rocks with sulfuric acid are treated with 20 kg. conc. nitric acid and then mixed at a temperature of 80–90° C. with soda ash by stirring until a pH value 8.2–8.4 has been obtained, whereupon the mass is filtered. The filtrate is concentrated and reduced to a dry powder by a spray dryer. This powder is passed at a temperature of about 300° C. through the rotary kiln, the mass being left in the oven for about 20 minutes. A mixture is obtained consisting of sodium tripolyphosphate and tetrasodiumpyrophosphate. The composition of this mixture with respect to the two compounds mentioned above may be calculated from the ratio $Na_2O:P_2O_5$. Without the addition of the nitric acid substantially no tripolyphosphate would have been formed.

*Example 4*

Example 2 was repeated but a mixture of one mole sodiumphosphate and 2 moles of disodiumphosphate, mixed together with 2.47% nitric acid (d.=1.42) and 1.24% dicyandiamide was used. By calcination in the manner mentioned above there were obtained 97% tripolyphosphate.

*Example 5*

Example 2 was repeated with a mixture consisting of 1 mole monosodium phosphate, 2 moles disodiumphosphate, and 1.113% nitric acid (d.=1.42). There was obtained a product which contained 92% tripolyphosphate.

*Example 6*

Example 2 was repeated using a mixture consisting of one mole monosodiumphosphate and two moles disodiumphosphate, 4.03% nitric acid and 1.213% urea. The mixture was calcinated at a temperature of about 460° C. for about half an hour. The obtained product contained 97.5% tripolyphosphate.

*Example 7*

A mixture of 400 kg. disodiumphosphate $$(Na_2HPO_4.12H_2O)$$

and 41 kg. monosodiumphosphate ($NaH_2PO_4.2H_2O$), 2.7 kg. urea and 8.4 kg. nitric acid (d.=1.38) is molten together and calcinated in a spray dryer, until dry. The obtained product was sent into a rotary kiln and treated at a temperature of about 300° C. A product was obtained, 36% of which consisted of tripolyphosphate whereas the remainder of the $P_2O_5$ content was sodiumpyrophosphate.

*Example 8*

A mixture of 10.2 g. monopotassiumphosphate $$(KH_2PO_4)$$

27 g. monosodiumphosphate ($NaH_2PO_4$) and 85 g. disodiumphosphate was dissolved in 150 ccm. water, then dried on a calcination roller and exposed 1½ hours in a covered pan to a temperature of 260° C. 42% of the product recovered were potassium-sodium tripolyphosphate.

*Example 9*

To the same solution were added 1.5 g. urea and 2.5 g. nitric acid of a density of 1.39, the same treatment resulted in the recovery of a product, 91% of which were potassium-sodium-tripolyphosphate.

Various changes may be made in the composition of the starting material and the catalytic agents as well as in the manner of treating them, without departing from the invention or sacrificing the advantages thereof.

I claim:

1. The process of producing sodium tripolyphosphate ($Na_5P_3O_{10}$) which comprises heating a mixture of disodium phosphate and monosodium phosphate having a molar ratio of approximately 5 mols of sodium oxide to 3 mols of phosphorus pentoxide to a temperature between about 250° and 540° C., for a period of from about 10 to 90 minutes in the presence of from 0.5 to about 7 percent of a catalytic material selected from the group consisting of the nitrates of urea, guanidine, dicyandiamide, semicarbazide and hexamethylenetetramine and ammonium nitrate.

2. The process of claim 1 wherein the catalytic material is an ammonium nitrate.

3. The process of claim 1 wherein the catalytic material is urea nitrate.

4. The process of claim 1 wherein the catalytic material is guanidine nitrate.

5. The process of claim 1 wherein the catalytic material is dicyandiamide nitrate.

6. The process of claim 1 wherein the catalytic material is hexamethylene tetramine nitrate.

References Cited in the file of this patent

UNITED STATES PATENTS

| | | |
|---|---|---|
| 2,374,100 | Jackson | Apr. 17, 1945 |
| 2,419,147 | King | Apr. 15, 1947 |
| 2,419,148 | King | Apr. 15, 1947 |
| 2,618,605 | Schaeffer | Nov. 18, 1952 |

OTHER REFERENCES

Serial No. 464,623, Watzel (A. P. C.), published June 1, 1943.

Babor "General College Chemistry," page 390, Crowell & Co., New York, N. Y. 1940.

Karrer "Organic Chemistry," pages 218–219, Elsevier Publ. Co., New York 1946.

Ephraim "Inorganic Chemistry," page 697, Nordeman Publishing Corp., New York 1943.